A. H. PLANTE.
METAL TUBE BENDING MACHINE.
APPLICATION FILED MAR. 25, 1911.
1,016,771.
Patented Feb. 6, 1912.
3 SHEETS—SHEET 1.
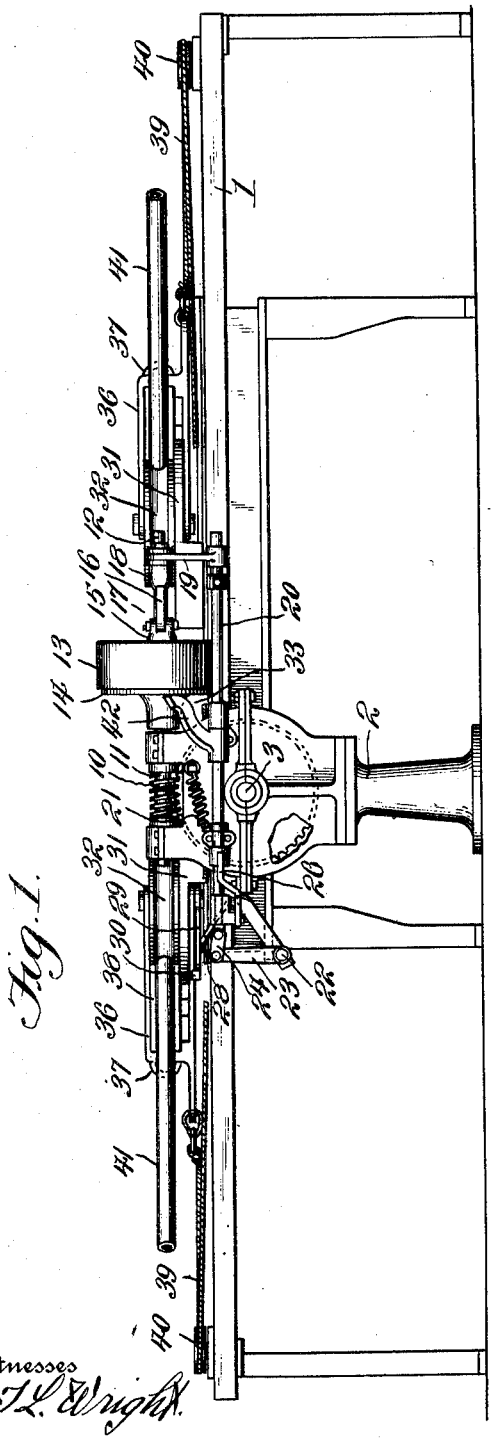
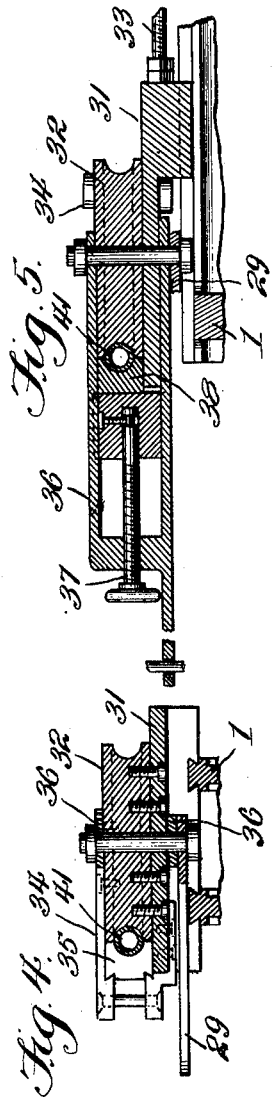
Witnesses
J. L. Wright
V. B. Hillyard
Inventor
Alfred H. Plante,
By Victor J. Evans,
Attorney A. H. PLANTE.
METAL TUBE BENDING MACHINE.
APPLICATION FILED MAR. 25, 1911.
1,016,771.
Patented Feb. 6, 1912.
3 SHEETS—SHEET 2.
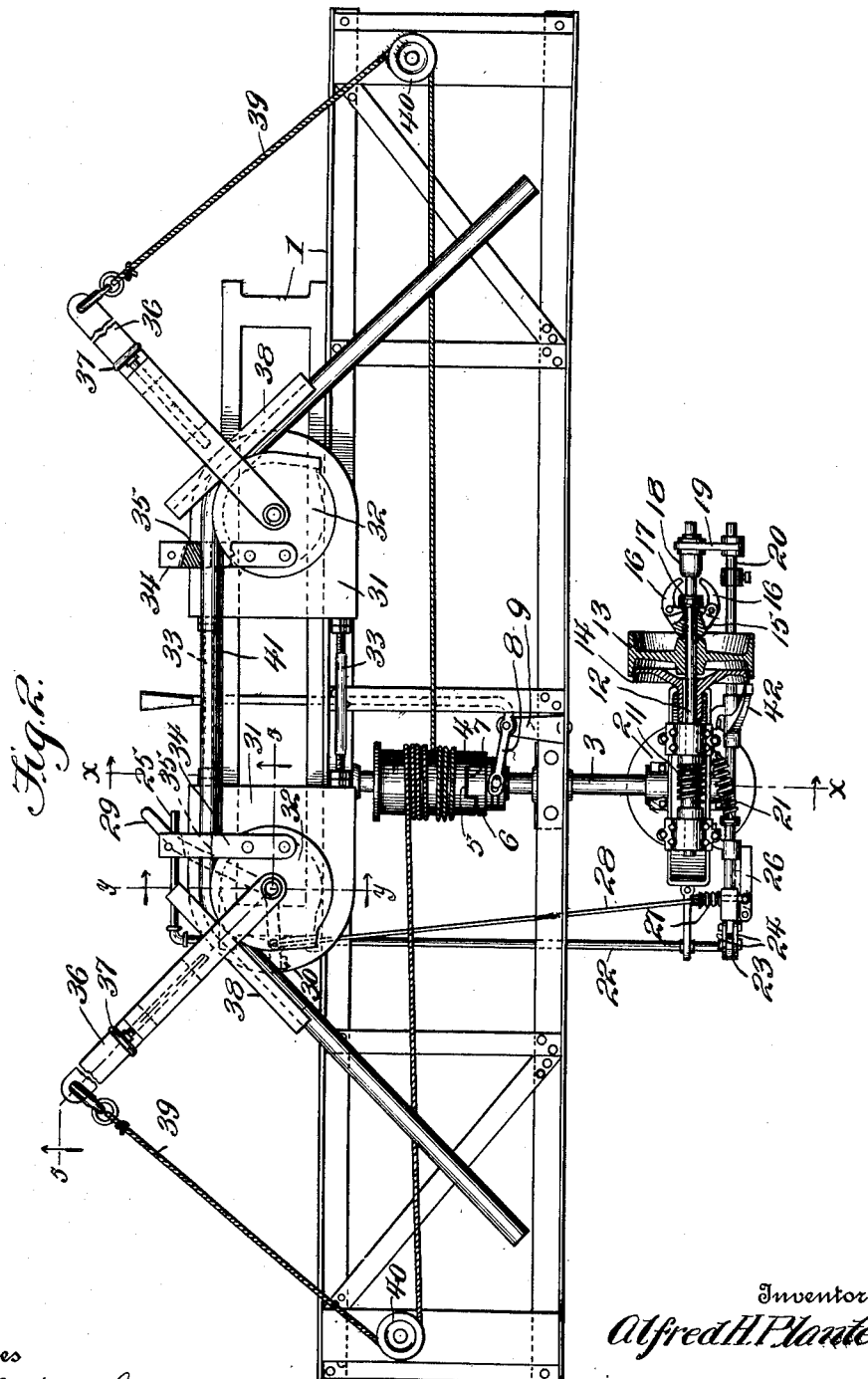
Witnesses
J. L. Wright
V. B. Hillyard
Inventor
Alfred H. Plante
By Victor J. Evans,
Attorney

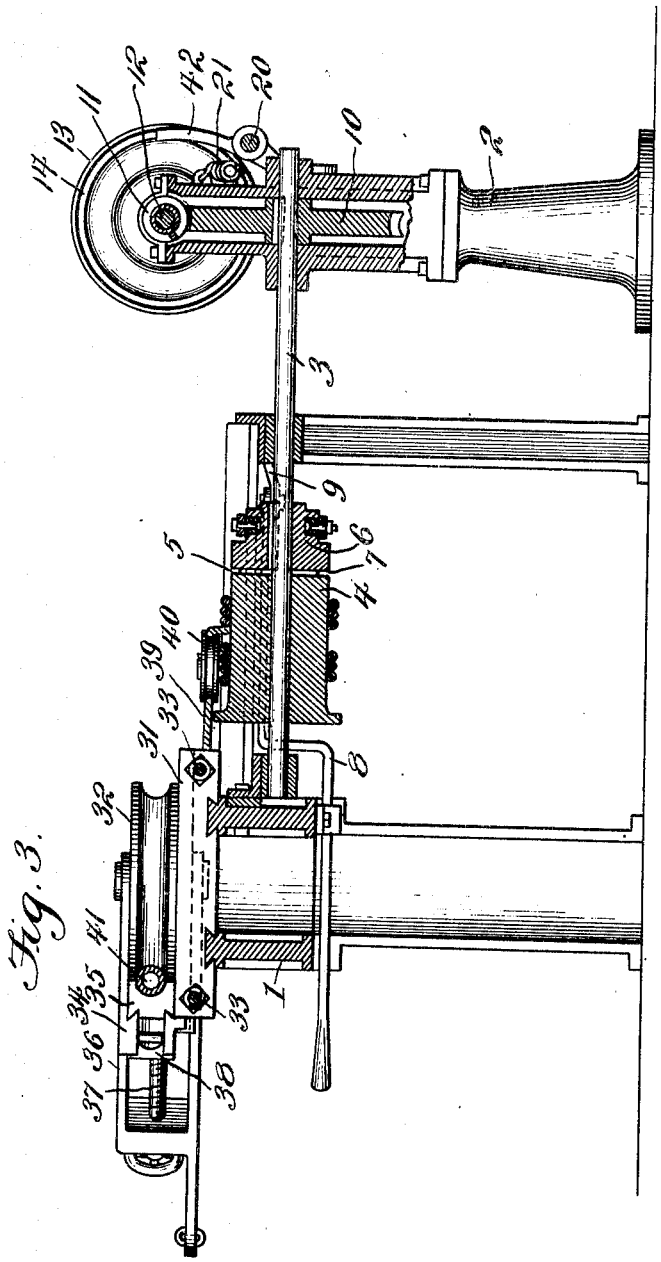

UNITED STATES PATENT OFFICE.

ALFRED H. PLANTE, OF ATLANTA, GEORGIA, ASSIGNOR TO ATLANTA METAL BED COMPANY, OF ATLANTA, GEORGIA, A CORPORATION OF GEORGIA.

METAL-TUBE-BENDING MACHINE.

1,016,771.	Specification of Letters Patent.	Patented Feb. 6, 1912.

Application filed March 25, 1911. Serial No. 616,900.

*To all whom it may concern:*

Be it known that I, ALFRED H. PLANTE, a citizen of the United States, residing at Atlanta, in the county of Fulton and State of Georgia, have invented new and useful Improvements in Metal-Tube-Bending Machines, of which the following is a specification.

The present invention provides a machine particularly designed for bending metal tubing, but which may be advantageously employed for bending metal rods or bars or material of like nature.

In the manufacture of metal beds from tubing the latter has generally been shaped by hand, which is a tedious and somewhat expensive operation.

The present invention provides a machine the object of which is to admit of the metal tubing being bent into the required shape without crushing or disturbing the cross sectional outline of the tubing.

The invention provides a machine which is practically automatic in operation after being started, the operating parts being thrown out of action after the predetermined result has been attained.

The invention consists of the novel features, details of construction and combination of parts, which hereinafter will be more particularly set forth, illustrated in the accompanying drawings, and pointed out in the appended claims.

Referring to the drawings, forming a part of this specification, Figure 1 is a side view of a machine specially designed for attaining the objects of this invention. Fig. 2 is a top plan view. Fig. 3 is a cross section on the line $x$—$x$ of Fig. 2. Fig. 4 is a sectional detail on the line $y$—$y$ of Fig. 2. Fig. 5 is a detail view of one of the bending arms.

Corresponding and like parts are referred to in the following description, and indicated in all the views of the drawings, by the same reference characters.

The machine embodies a framework 1 upon which the bending mechanism is mounted. A stand 2 is located at one side of the framework and supports the power transmitting mechanism. A shaft 3 is arranged horizontally and mounted in bearings of the framework 1 and stand 2. A drum 4 is loose upon the shaft 3 and has a half clutch 5 at one end. A collar 6 is slidable upon the shaft 3 and is keyed thereto and has a half clutch 7 upon its inner side to engage with the half clutch 5 and secure the drum to the shaft 3. A shipper lever 8 is pivoted to a bracket 9 attached to or forming part of the framework 1 and has one end in engagement with the collar 6 and its opposite end extending within convenient reach of the operator. A worm gear 10 is secured to the outer end of the shaft 3 and meshes with a worm 11 provided upon a longitudinal shaft 12, which is mounted in bearings at the upper end of the stand 2. A drive pulley 13 is loose upon the longitudinal shaft 12 and a portion of its rim is made flaring to form a clutch member, which is adapted to be engaged by a clutch member 14 of conical form secured to the shaft 12. A collar 15 is mounted loosely upon the shaft 12 and is in contact with the hub of the drive pulley 13. Bell cranks 16 are pivoted to the collar 15 and their short arms extend inwardly to engage a stop collar 17 secured to the shaft 12, whereas their long arms extend approximately in the direction of the shaft 12 to be engaged by a collar 18 when the latter is moved upon the shaft 12 toward the drive pulley 13. The collar 18 is approximately of conical form and when moved inward upon the shaft 12 forces the long arms of the bell cranks 16 outwardly, thereby causing the collar 15 to move inwardly and force the drive pulley 13 in engagement with the clutch member 14, whereby the shaft 12 and shaft 3 are caused to rotate. The collar 18 is engaged by means of an arm 19 fastened to an end of a rod 20 arranged parallel with the shaft 12 and mounted in bearings provided upon the stand 2. A spring 21 has one end connected with the rod 20 and its opposite end secured to the stand 2, said spring being of the contractile type and serving to hold the rod 20 at the limit of its movement in one direction. A rock shaft 22 is mounted in bearings of the framework 1 and stand 2 and has an arm 23 which is connected by means of a link 24 with the rod 20. The rock shaft 22 has an operating handle 25 within convenient reach of the operator. A latch 26 has pivotal connection with the rod 20 and is adapted to engage a part of the stand 2 so as to hold the rod 20 when moved to the left to throw the drive pulley in clutched engagement with the shaft 12. A spring 27 normally exerts a force upon the latch 26 to throw the same into locking engagement with a part of the stand 2 after the rod 20 has moved to the predetermined position. The spring 27 is mounted upon a short rod to which a long rod 28 is connected, the rod 28 having pivotal connection with one member of an elbow lever 29, the other member of said elbow lever having a bent portion 30 extending into the path of one of the bending arms to be engaged thereby and tripped when the required bending operation has been effected.

Slides 31 are mounted upon the framework, each being provided with a die 32 about which the tube or other material is bent. The slides 31 are adjustable so as to be spaced apart a greater or less distance and are moved by means of set screws 33, which have their end portions oppositely threaded to engage right and left hand threaded portions of the slides 31. The dies 32 are supported by means of the slides 31 and may be of any shape to suit the required bend. The edges of the dies are grooved to prevent lateral displacement of the work. The dies have faces at different distances from the center, certain of the faces being curved and other faces straight. Work holders are employed in connection with the dies to secure the material and while the construction of the work holders may vary according to the nature of the material to obtain the best results it is preferred to construct each of the work holders of a frame 34 of substantially U form and to provide clamp blocks 35 of wedge form, the work holders being secured to opposite sides of the dies and the wedge blocks 35 being adapted to be forced between the members of the work holder. The inner faces of the wedge blocks 35 are grooved to conform to the tube or other material to be bent.

The bending arms 36 are pivotally mounted upon the slides 31 concentric with the dies 32 and are supplied with set screws 37 for adjusting dies 38 which are adapted to act in opposition to the dies 32 so that the tube or other material is confined between the two dies. The dies 38 are elongated or consist of bars and are adapted to engage a straight portion of the tube, rod or bar to insure bending thereof without crushing or distorting the outline of the work in the event of the same consisting of a tube. A cable 39 is attached to each of the bending arms 36 and passes around a guide pulley 40 and is attached to the drum 4 so as to wind thereon. The cables 39 wind reversely on the drum 4, thereby drawing the outer ends of the bending arms 36 outwardly and inwardly so as to carry the dies 38 about the dies 32 to bend the tube 41 or like material about the said dies 32.

In the operation of the machine the slides 31 having the selected dies 32 attached thereto are properly adjusted to bring the dies 32 to the required distance apart. The bending arms 36 are moved to occupy a position about parallel with a prolongation of the shaft 3, after which the tube 41 or like article is placed in position and secured by means of the work holders. The dies 38 are now placed upon the work and the set screws 37 adjusted so as to closely confine the tube 41 or work between the two dies. The shaft 22 is turned by means of the handle 25 to move the rod 20 to throw the drive pulley 13 in clutched engagement with the shaft 12, whereby the shaft 3 is caused to rotate and after the inertia of the parts has been overcome the lever 8 is operated to move the collar 6 into clutched engagement with the drum 4, which latter rotating with the shaft 3 winds the cables 39 thereon and draws the outer ends of the bending arms 36 outwardly and inwardly, thereby bending opposite end portions of the tube 41 about the dies 32. When the tube has been bent to the required position one of the bending arms comes in contact with the bent end of the lever 29 and trips the same, thereby releasing the latch 26, which previously engaged a part of the stand 2 upon movement of the rod 20 to throw the drive pulley into clutched engagement, thereby releasing the rod 20 and permitting the spring 21 to return the same to normal position, whereby the drive pulley is automatically disconnected from the shaft 12 and the operation of the machine stopped. The work is now removed from the machine, after which the bending arms are restored to their first position so that the next tube, rod or bar to be bent may be placed in position for a repetition of the operation just described.

A brake arm 42 is attached to the rod 20 and is normally held in engagement with the clutch member 14 so as to prevent rotation of the shaft 12 when the drive pulley 13 is disengaged from the said clutch member.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In a machine of the character described, the combination of bending mechanism, means for transmitting power to the bending mechanism including a shaft, a second shaft geared to the power transmitting shaft, a loose pulley mounted on the second shaft and having a clutch member, a companion clutch member secured to said second shaft, a rod, connecting means between the rod and second shaft for throwing the loose pulley into clutched engagement with said second shaft, means for moving the rod in one direction to hold the loose pulley out of clutched engagement with said second shaft, a latch for holding the rod when moved to throw the loose pulley into clutched engagement with said second shaft, and a trip mechanism actuated by the bending mechanism to effect release of the rod.

2. In a machine of the character described, the combination of bending mechanism, power transmitting means including a shaft, a second shaft connected with the first mentioned shaft, a loose pulley mounted upon the second shaft and having a clutch member, a companion clutch member secured to the second shaft, a rod, connecting means between said rod and loose pulley for moving the latter into engagement with the clutch member secured to the second shaft, means for moving the rod in one direction to hold the loose pulley out of clutched engagement, means for securing the rod when moved in an opposite direction to throw the loose pulley into clutched engagement, operating means for moving the said rod, and a trip mechanism actuated by the bending mechanism for effecting release of the rod to permit of the loose pulley automatically freeing itself from the clutch member secured to the said second shaft.

3. In a machine of the character described, the combination of bending mechanism, a power transmitting shaft, a second shaft connected with the power transmitting shaft, a loose pulley mounted upon the second shaft and provided with a clutch member, a companion clutch member secured to said second shaft, a longitudinally movable rod, connecting means between the rod and loose pulley for throwing the latter into engagement with the clutch member secured to the second shaft, a brake member carried by said rod and normally engaging the said companion clutch member when the loose pulley is freed therefrom, means for yieldingly moving the said rod in one direction, means for moving the rod in the opposite direction to release the brake and to throw the loose pulley into clutched engagement with said second shaft, means for securing the said rod when moved into the last mentioned position, and a release mechanism adapted to be actuated by the bending mechanism for freeing said rod from the holding means.

4. In a machine of the character described, the combination of a bending mechanism, operating means therefor including a shaft, a pulley loose upon said shaft and having a clutch member, a companion clutch member secured to the shaft, a collar loose upon the shaft, bell cranks pivoted to said collar, a second collar adapted to engage corresponding members of the bell cranks, a longitudinally movable rod, connecting means between said rod and the second collar, means normally tending to move the rod in one direction, means for moving the rod in the opposite direction for throwing the loose pulley into clutched engagement, means for holding said rod in the last mentioned position, and a trip mechanism adapted to be actuated by the bending mechanism for effecting release of the rod for throwing the loose pulley out of clutched engagement.

5. In a machine of the character described, the combination of bending mechanism, a power transmitting shaft including a manually operable clutch, a second shaft connected with the power transmitting shaft, a loose pulley mounted upon the second shaft and having a clutch member, a companion clutch member secured to the second shaft, a longitudinally movable rod, connecting means between said rod and loose pulley for throwing the latter into clutched engagement with said companion clutch member, a brake member mounted upon said rod and adapted to engage the said companion clutch member, means for yieldingly moving the rod in one direction, means for moving said rod in an opposite direction to throw the loose pulley into clutched engagement, means for securing the rod in the last mentioned position, and a trip mechanism for releasing the holding means.

In testimony whereof I affix my signature in presence of two witnesses.

ALFRED H. PLANTE.

Witnesses:
E. B. FINCHER,
E. S. ARMISTEAD.